United States Patent
Dubose et al.

(10) Patent No.: US 9,497,956 B2
(45) Date of Patent: Nov. 22, 2016

(54) VEGETATION CONTROL SYSTEM FOR DISTRIBUTION OF CHEMICALLY-BASED TREATMENTS

(71) Applicant: HELENA CHEMICAL CORP., Memphis, TN (US)

(72) Inventors: Burnett G. Dubose, Monetta, SC (US); Joseph R. Weakland, Moultrie, GA (US); William R. Foy, Moultrie, GA (US)

(73) Assignee: HELENA CHEMICAL CORP., Collierville, TN (US)

( * ) Notice: Subject to any disclaimer, the term of this patent is extended or adjusted under 35 U.S.C. 154(b) by 0 days.

(21) Appl. No.: 14/747,391

(22) Filed: Jun. 23, 2015

(65) Prior Publication Data

US 2015/0351377 A1 Dec. 10, 2015

Related U.S. Application Data

(63) Continuation-in-part of application No. 13/860,665, filed on Apr. 11, 2013, now abandoned.

(60) Provisional application No. 61/622,746, filed on Apr. 11, 2012.

(51) Int. Cl.
*A01M 21/04* (2006.01)
*A01M 7/00* (2006.01)

(52) U.S. Cl.
CPC ........... *A01M 21/043* (2013.01); *A01M 7/005* (2013.01); *A01M 7/0071* (2013.01)

(58) Field of Classification Search
CPC ............. A01M 7/005; A01M 7/0053; A01M 7/0057; A01M 7/0071; A01M 21/043; B05B 13/005; B05B 16/06; B05B 15/064; B05B 15/08

USPC ....... 239/146, 159, 160, 164–166, 172, 176, 239/329
See application file for complete search history.

(56) References Cited

U.S. PATENT DOCUMENTS

| | | | | |
|---|---|---|---|---|
| 2,965,307 | A | * 12/1960 | High | ................... A01M 7/0071 169/25 |
| 3,744,719 | A | 7/1973 | Wallick | |
| 4,447,007 | A | * 5/1984 | Farines | ............... B05B 13/0431 239/165 |
| 4,709,505 | A | * 12/1987 | Lempa, Jr. | .......... A01M 7/0089 47/1.5 |
| 4,784,324 | A | 11/1988 | DeWitt | |
| 4,946,102 | A | * 8/1990 | DeWitt | ............... A01M 7/0075 239/167 |
| 5,501,257 | A | 3/1996 | Hickman | |
| 6,990,770 | B2 | 1/2006 | Terrell | |
| 2008/0258124 | A1 | 10/2008 | Farmer | |
| 2012/0279614 | A1 | 11/2012 | Terrell | |
| 2013/0270354 | A1 | 10/2013 | DuBose | |

* cited by examiner

*Primary Examiner* — Darren W Gorman
(74) *Attorney, Agent, or Firm* — Drinker Biddle & Reath LLP

(57) ABSTRACT

A vegetation control system for use with chemically-based treatments includes at least one distribution apparatus and at least one reservoir mounted onto a mobile unit. Routed within a passageway or passageways in the distribution apparatus are one or more conduits. These conduits are configured to route the chemically-based treatment from the reservoir through the passageway(s) to an end of the distribution apparatus, having one or more nozzles. The vegetation control system may be used by an operator to target specific branches and other specified areas of vegetation for treatment. The distribution apparatus is mounted onto the mobile unit for application of the treatment in various areas.

19 Claims, 15 Drawing Sheets

VEGETATION CONTROL SYSTEM FOR DISTRIBUTION OF CHEMICALLY-BASED TREATMENTS

CROSS-REFERENCE TO RELATED APPLICATION

This application is a continuation-in-part application based on U.S. Ser. No. 13/860,665, filed Apr. 11, 2013 which claims priority to U.S. Provisional Application No. 61/622,746, filed Apr. 11, 2012. The entirety of these priority applications is incorporated herein by reference.

BACKGROUND OF THE INVENTION

1. Field

The present disclosure relates to vegetation control systems, and particularly vegetation control systems for distribution of chemically-based treatments.

2. Background

For several reasons, controlling and managing the growth of trees and other types of vegetation located near power transmission lines is very important. Dangers can result from uncontrolled and unmanaged growth. For example, just one fallen tree or large tree branch could prevent transmission of electricity to thousands of homes and businesses. Failure to provide electricity to homes and businesses can lead to various other problems, which ultimately stems from failure to control and manage vegetation.

Because of the large potential impact of failing to properly control and manage vegetation, federal and state standards mandate that utility companies maintain sufficient clearances between vegetation and power transmission lines. To meet and/or exceed these standards, many utility companies implement vegetation management plans. Some plans specify monitoring vegetation growth and periodic trimming of vegetation located along pathways, which can in some cases span and reach tens of thousands of miles.

To address the full span and reach of these pathways of vegetation, utility companies spend millions of dollars implementing vegetation management plans and using transitory vegetation control systems.

One negative aspect associated with the cost and implementation of these plans and systems results from systems using sharp-edged components. Whether manually or remotely used by an operator, sharp-edged components such as saw blades must be used by highly-skilled operators who can quickly and efficiently navigate around power lines. However, regardless of their level of skill, the use of sharp-edged components still results in unavoidable issues. For example, injury can result from fallen debris, power lines could be accidentally cut, etc.

Some vegetation control systems have proposed chemically-treating vegetation. A few known systems have even specified the use of chemical-treatments. However, these systems are known for liberal and uncontrolled distribution of vegetation control products such as herbicides. The use of these types of systems can therefore result in unwanted and inadvertent treatment over areas which are not considered problematic.

Despite these potential issues, many utility companies find using chemical-treatments very effective. Treatments can be tailored to affect specific types of vegetation, which can generally reduce re-sprouting by effective treatment of entire plant families. Application of treatments can also be phased in over time to coordinate with expected growth patterns. Moreover, using chemical-treatments alone can also avoid various issues and costs associated with using sharp-edge components.

For these reasons among others, there is a clear need for improved vegetation control systems designed for distribution of chemically-based treatments. The present invention fulfills this need and provides further related advantages, as described in the following summary.

SUMMARY

The present invention is directed to vegetation control systems for use with chemically-based treatments. These systems include at least one distribution apparatus and at least one reservoir coupled to the distribution apparatus. Routed within one or more passageways in the distribution apparatus are one or more conduits. These conduits are configured to route the chemically-based treatment from the reservoir through the passageway(s) to a distribution end of the distribution apparatus. The conduits include one or more nozzles, which are used to apply the chemically-based treatment onto unwanted vegetation. The vegetation control system may be used by an operator to target specific branches and other specified areas of vegetation for treatment. The distribution apparatus is preferably mounted onto the mobile unit for application of the treatment in various areas.

A more complete understanding of the vegetation control systems disclosed herein will be afforded to those skilled in the art, as well as a realization of additional advantages and objects thereof, by consideration of the following detailed description. Reference will be made to the appended sheets which will first be described briefly.

BRIEF DESCRIPTION OF THE DRAWINGS

The drawings described herein are for illustrative purposes only and are not intended to limit the scope of the present disclosure. In the drawings.

DETAILED DESCRIPTION

Figure 1:
FIG. 1 shows a first configuration of a vegetation control system.
Figure 2:
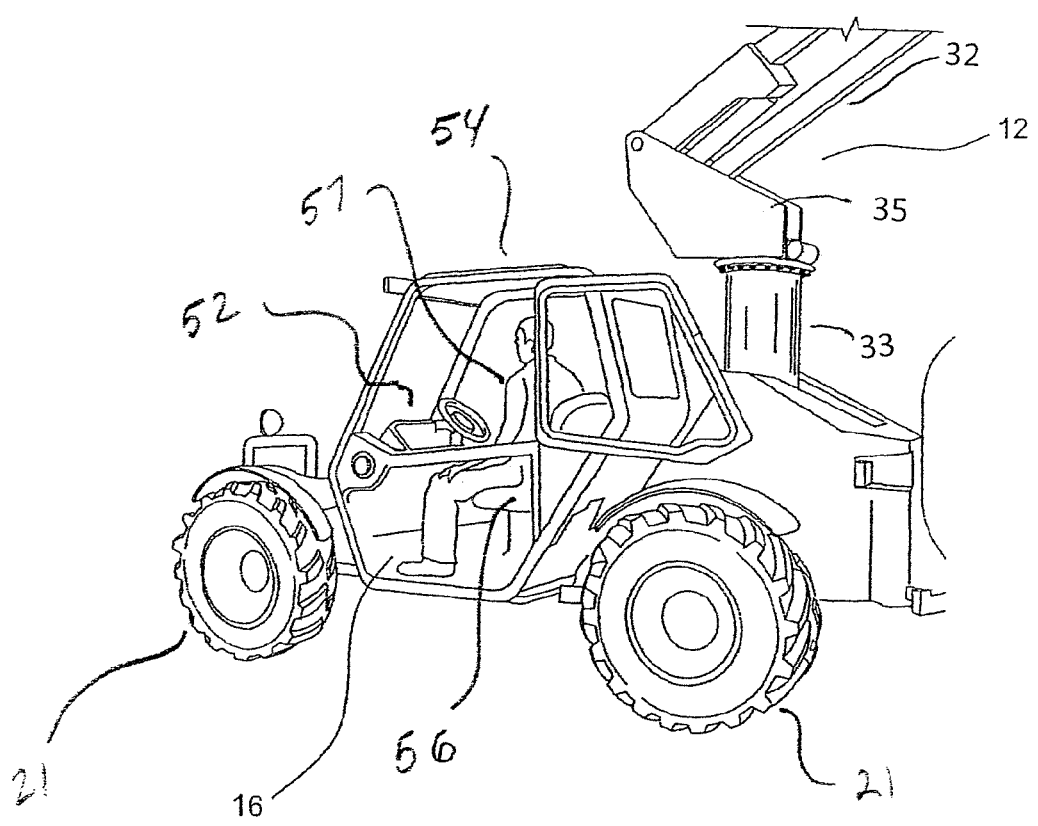
FIG. 2 shows one type of mobile unit for use with the vegetation control system shown in FIG. 1.
Figure 3:
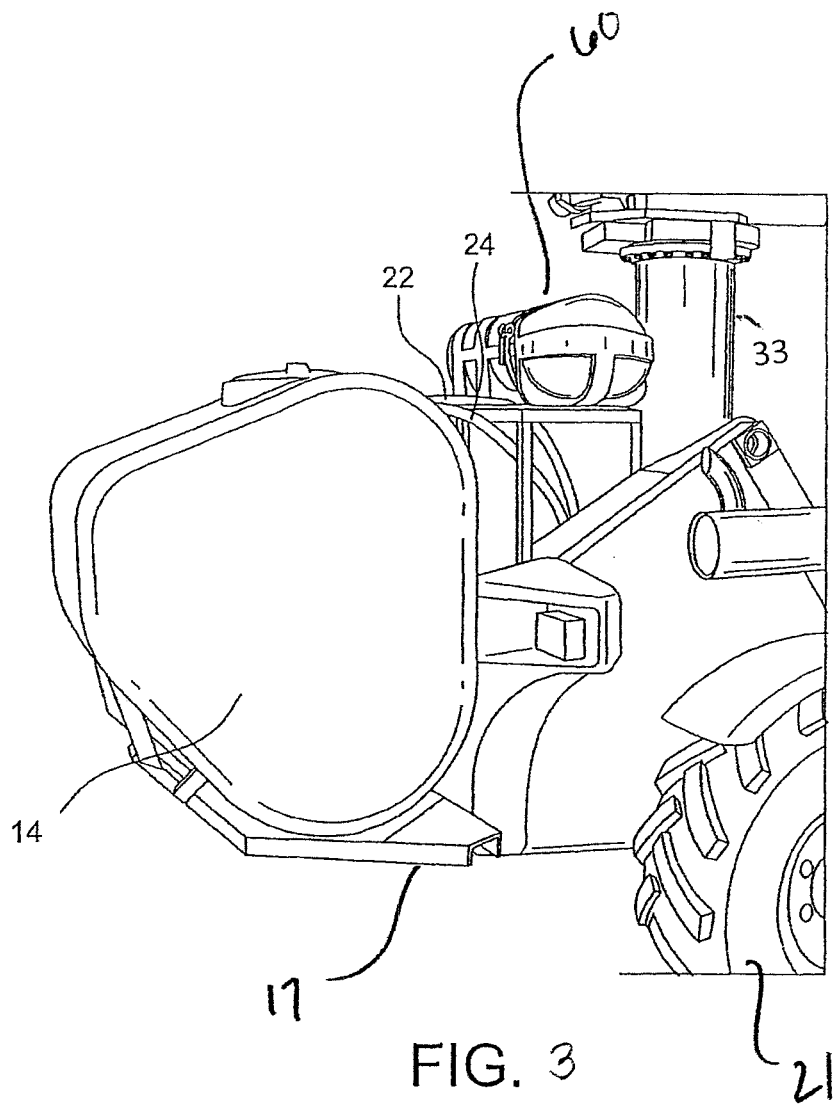
FIG. 3 shows a partial side view of the vegetation control system shown in FIG. 1.
Figure 6:
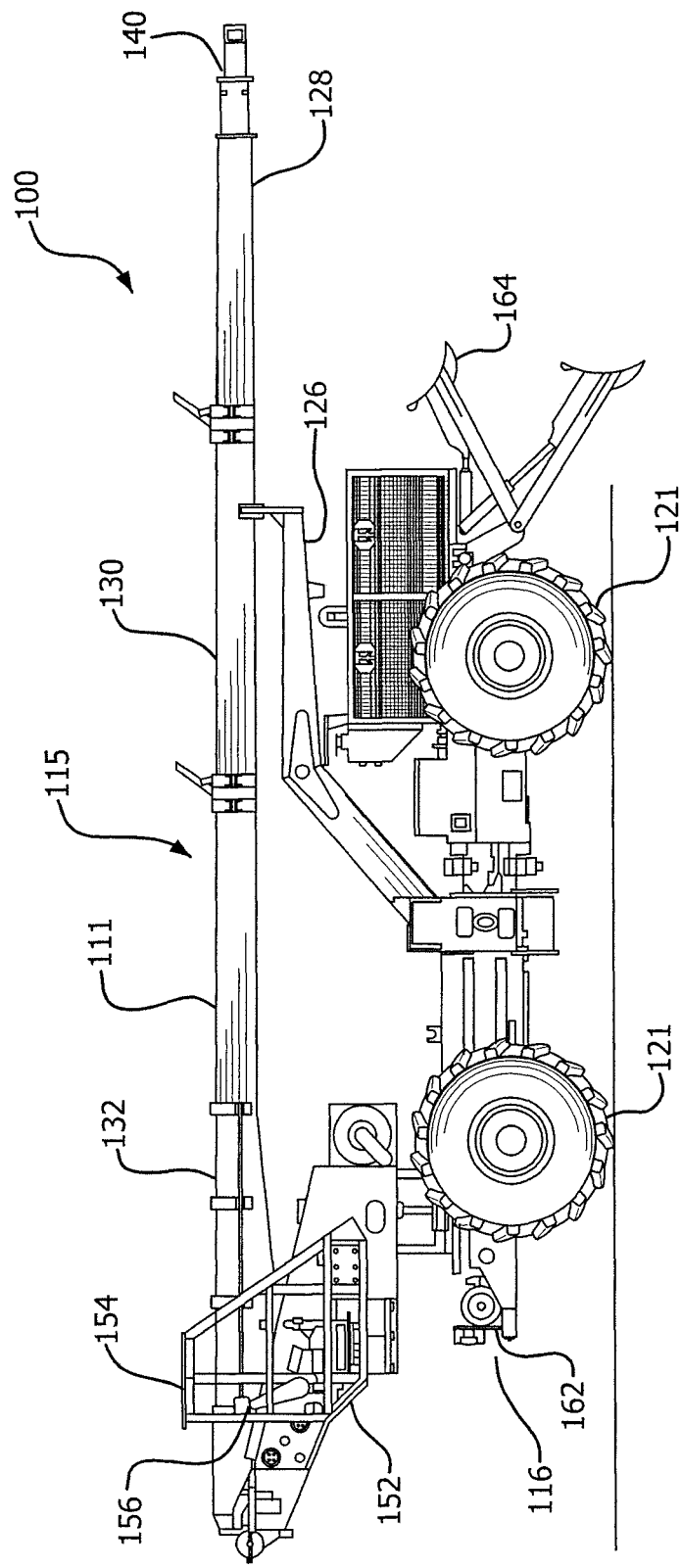
FIG. 6 is a side view of a second configuration of a vegetation control system.

FIGS. 1 and 6 show configurations of vegetation control systems 10,100 used for distribution of a chemically-based treatment 50 (FIG. 1). These vegetation control systems are used for control, management, and suppression of unwanted vegetation, particularly in areas which are elevated and difficult to reach. Such areas may be positioned near power transmission lines, lighting, and other types of equipment. In these areas, uncontrolled and unmanaged vegetation can easily cause interference with equipment operation. Other areas where the vegetation control system could be used include, but are not limited to, roadside areas such as those located in various municipalities and positioned near railroads, piping, fenced rows, wildlife openings, communication lines, waterways, canal ways, forestry roadsides and paths, fencelines, and pipelines.

Instead of using sharp-edge components, the systems 10,100 are configured to distribute in a targeted manner a chemically-based treatment 50 (FIG. 1) for control, management, and suppression of unwanted vegetation. The type of treatment used, however, depends on many factors. Generally the treatment is specific to the type of vegetation to be controlled. Other factors that may be considered in determining the type of chemically-based treatment include: the environment in which distribution of the treatment occurs, (e.g. wetland aquatic areas and swamps), the growth pattern of the vegetation, the severity of vegetation encroachment, the potential for interference resulting from vegetation growth, and the type of plant species.

A chemically-based treatment may be a combination of herbicides, drift control agents, diluents, and additives. Preferably, a foliar prescription is used for enhanced leaf penetration and protection of grasses. One known herbicide suitable for use is sold by the DuPont Corporation under the brand name KRENITE®.

Application of the chemically-based treatment may be targeted to branches of vegetation, particularly during periods where foliage is limited. For example, during times when the climate is colder many deciduous trees are without foliage. During these times, a dormant prescription may be utilized, which provides for enhanced bark penetration. Generally, within one to two weeks after application of the chemically-based treatment, vegetation will gradually begin to wither.

Figure 7:
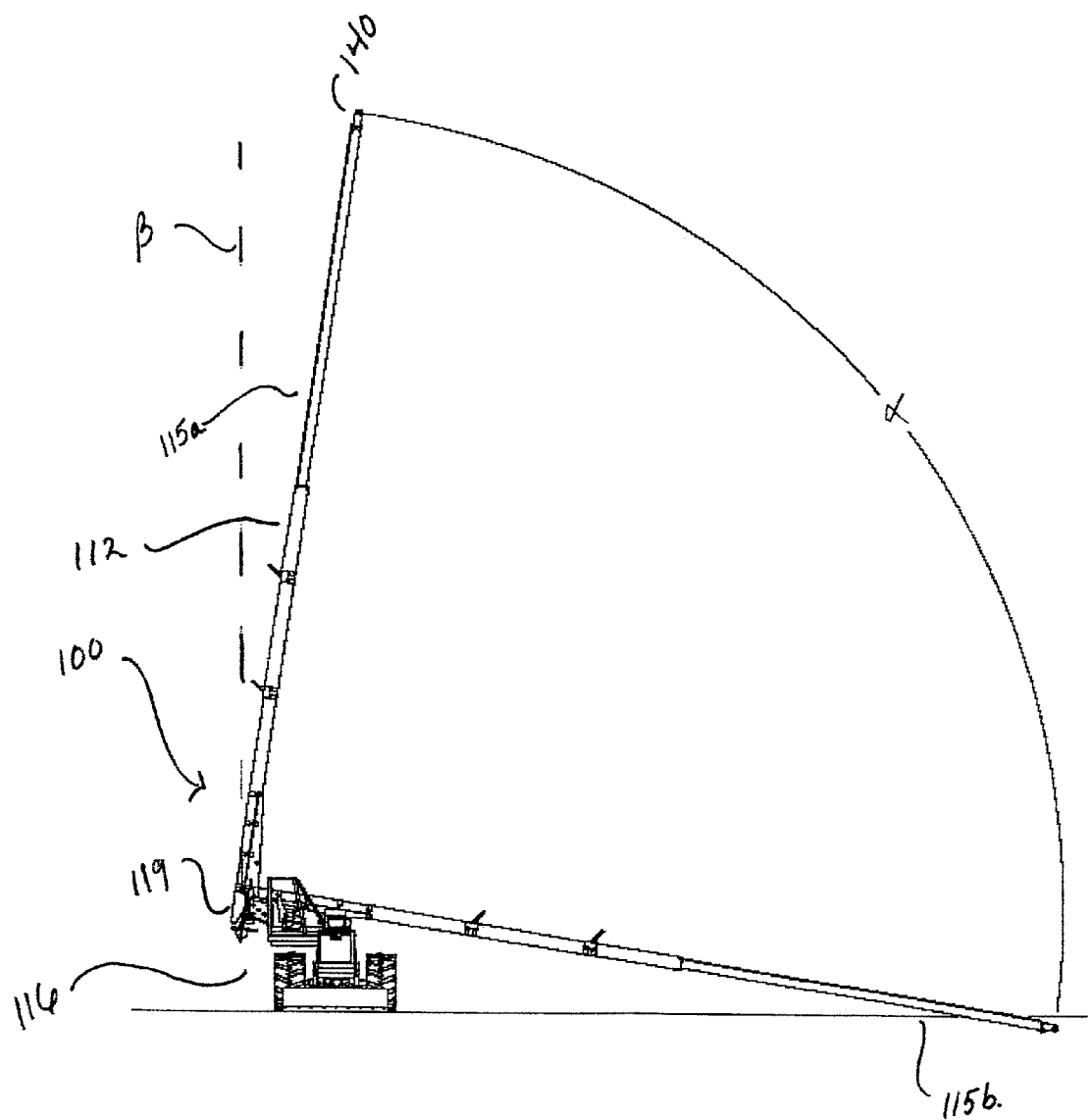
FIG. 7 is a side view of the vegetation control system shown in FIG. 6, showing the span and reach of the boom sections.

Referring to FIGS. 1-5, this configuration of the vegetation control system 10 includes at least one distribution apparatus 12 and at least one reservoir 14 coupled to the distribution apparatus. The distribution apparatus 12 is coupled to one or more reservoirs 14 containing chemically-based treatment(s) 50. FIGS. 6 and 7 show another configuration of a vegetation control system 100. This configuration also includes a distribution apparatus 112 and one or more reservoirs 114 (not shown in FIGS. 6 and 7) containing chemically-based treatment(s) 50.

Each configuration of the distribution apparatus 12,112 includes an extendable device 11,111 with a plurality of extension sections 28,30,128,130, and a lower section 32,132 that preferably mount to mobile units 16,116. The second system configuration, however, optionally includes a secondary arm 126 for positioning of the extendable device 111. The distribution apparatuses 12,112 basically include crane assemblies having a plurality of telescopic boom sections 15,115. Suitable crane assemblies include hydraulic crane assemblies such as those manufactured by Altec. These types of crane assemblies generally have boom lengths ranging from about 50 feet to about 150 feet. Longer or shorter boom lengths may be specified, however, depending on the area(s) to be treated. Preferred boom configurations have a reach of at least about 75 feet from the ground.

As illustrated in FIG. 1 the boom 15 includes outermost extension 28 at the distribution end of the boom with the outermost section 28 telescoping into adjacent extension section 30. Extension section 30 is mounted to lower section 32 by articulating joint 31. Lower section 32 is mounted to post 33 on the mobile unit 16 by connecting joint 35.

The distribution assemblies 12,112 may include a telescopic articulating aerial device such as those manufactured by Altec and sold as model number AT37-G. This type of device includes a hydraulically powered boom, having a lower boom section and an upper articulating arm. Boom articulation for the lower section ranges from about 25° to about 75°, while boom articulation for the articulation arm ranges from about 7° to about 90°. When the boom is in a stowed position suitable for travel, it has an overall height of approximately 10 feet. Other ranges of articulation may be suitable, depending on the chosen configuration of the distribution apparatus. Preferably, the boom is manufactured from one or more materials which provide sufficient chemical and weather resistant for frequent exposure to various weather conditions. For example, the boom may be manufactured from fiberglass composite materials that include electrical insulation. FIG. 7 shows one example of the angular span and reach of telescopic boom sections moving from a first position 115a to a second position 115b. The angular span a shown in FIG. 7, however, should not be construed as limiting. The angular span may have a reach spanning up to 180° with respect to a vertical axis p, having a vertex originating at a pivot area 119 of the lower boom section.

Figure 8:
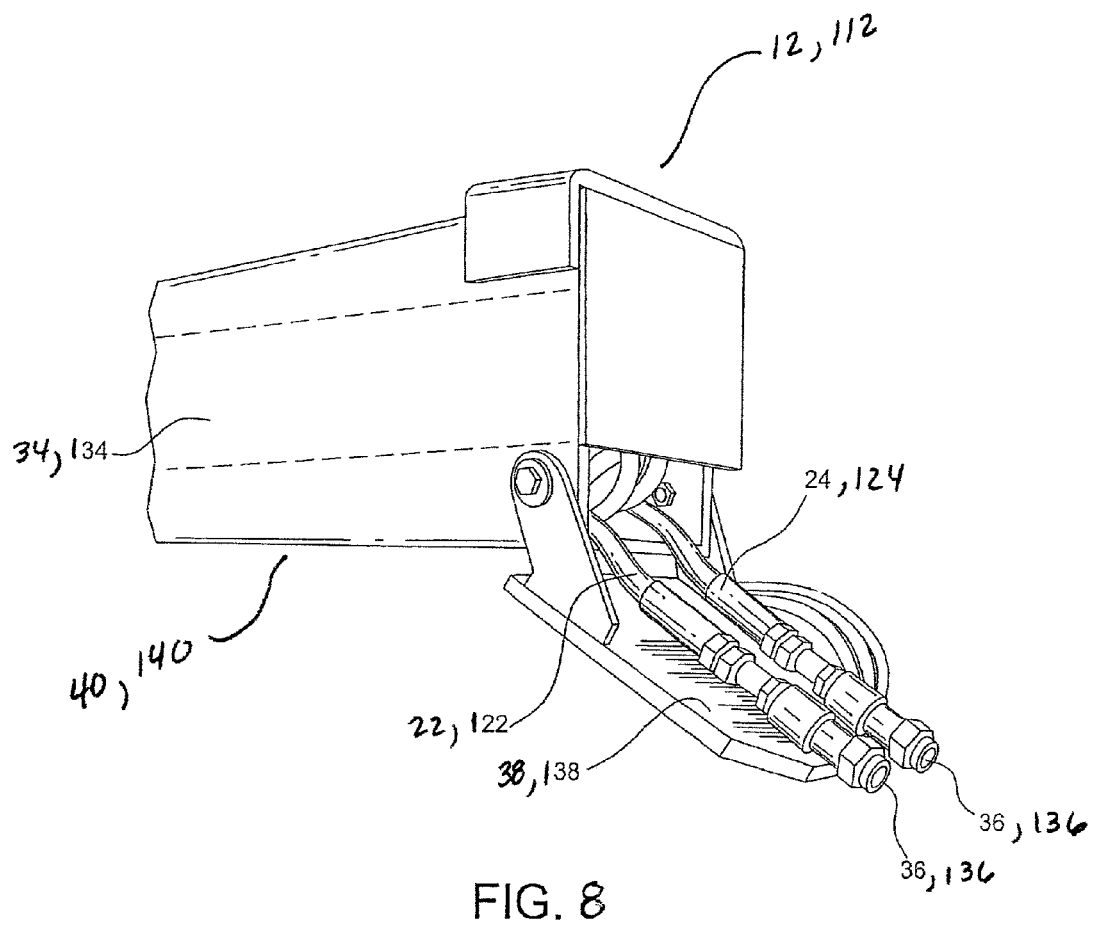
FIG. 8 shows a partial view of a distribution end for use with the apparatuses shown in FIGS. 1 and 6.

As shown particularly in FIG. 8, passageways 34,134 are defined within each distribution end 40,140 of the apparatuses for routing of conduits 22,24,122,124 to nozzles 36,136 which are coupled to the reservoir. A mounting unit 38,138 is used to hold the nozzles in place at the distribution end 40,140 of each apparatus 12,112. As shown in FIG. 8 nozzles 36,136 extend longitudinally out of the distribution end 40,140 which is at the end of outermost section 28,128. The nozzles 36,136 are mounted at the end of the flexible conduits 22,24,122,124.

Defined within each distribution apparatus 12,112 are passageways 34,134 which may be used for routing conduits 22,24,122,124 from the reservoir 14,114 to the distribution end 40,140. At this end of the apparatus, nozzles 36,136 are used to distribute the chemically-based treatment onto vegetation, as shown particularly in FIGS. 9A and 9B.

Figure 9A:
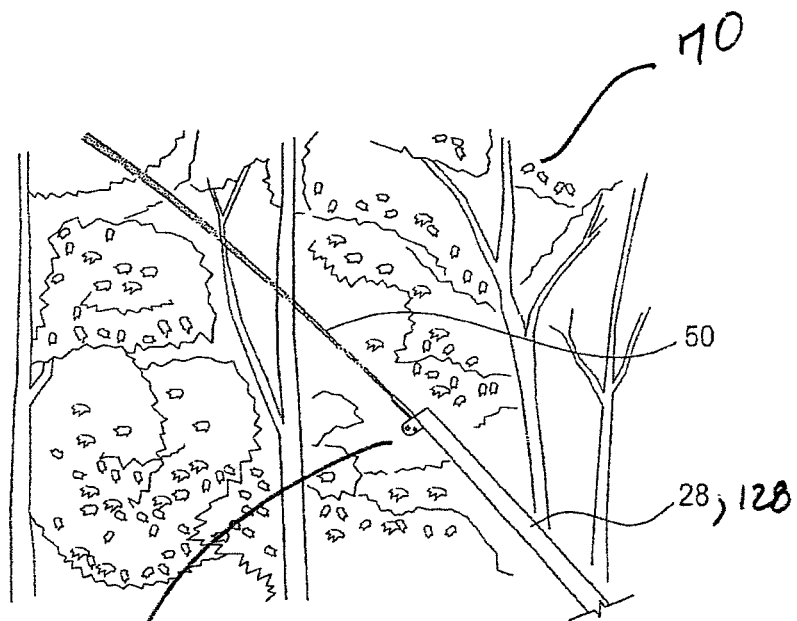
FIG. 9A shows a partial view of an end upper section of a distribution apparatus, distributing a chemically-based treatment onto vegetation.
Figure 9B:
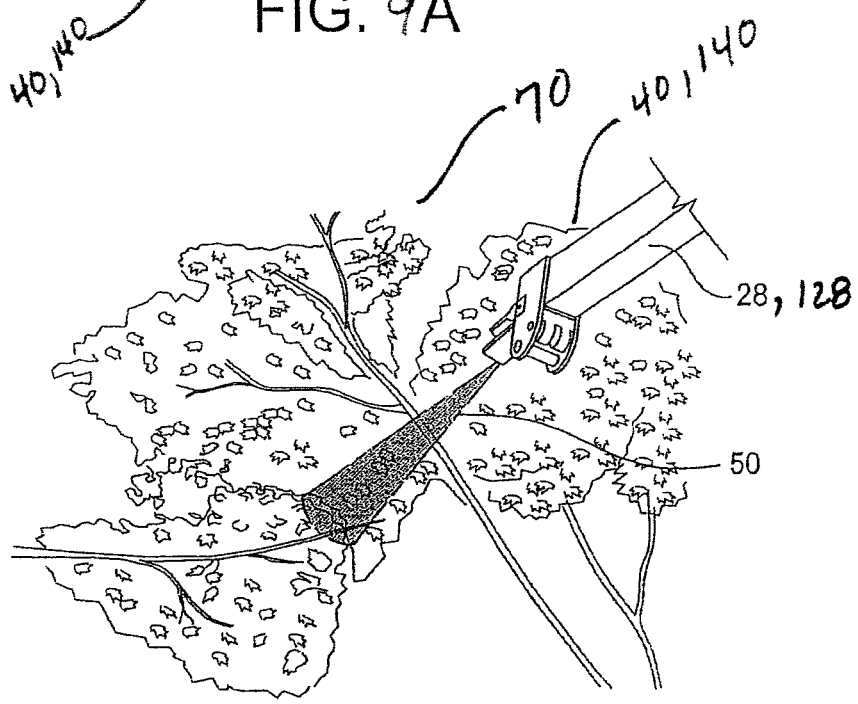
FIG. 9B shows another partial view of an upper end section of a distribution apparatus, distributing a chemically-based treatment onto vegetation.

Referring to FIGS. 8, 9A, and 9B, nozzles 36,136 are used within each distribution apparatus 12, 112 to target specific branches and/or leaves of vegetation 70. Suitable nozzles include TEEJET® solid stream, spray, and fan type nozzles which can distribute chemically-based treatments at various distances and rates. Nozzle types suitable for use within the distribution assembly may include, but are not limited to ¼ inch STREAMJET® Solid Stream Nozzles, having a 0040 orifice size. These types of nozzles are rated for liquid pressures ranging from about 15 pounds per square inch (psi) to about 60 psi with a capacity per nozzle ranging from about 2.45 gallons per minute (gpm) to about 5.0 gallons gpm. Another type of nozzle suitable for use within the distribution assembly is the TEEJET® 1540 spray nozzle.

Coupled to each nozzle is a conduit 22,24,122,124 which is used to route the chemically-based treatment from the reservoir 14,114 to the distribution end 40,140 of each apparatus 12,112. These conduits are manufactured from one or more materials which are chemically compatible with the chemically-based treatment and suitable for a particular applications of chemical treatment(s).

Figure 4:
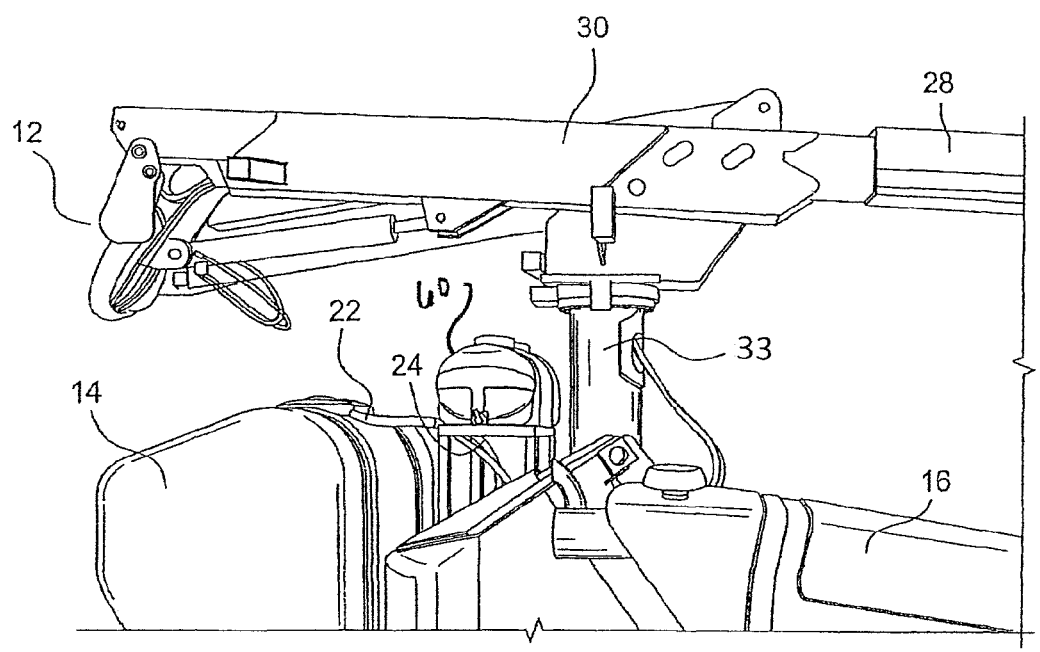
FIG. 4 shows another partial side view of the vegetation control system shown in FIG. 1.
Figure 11:
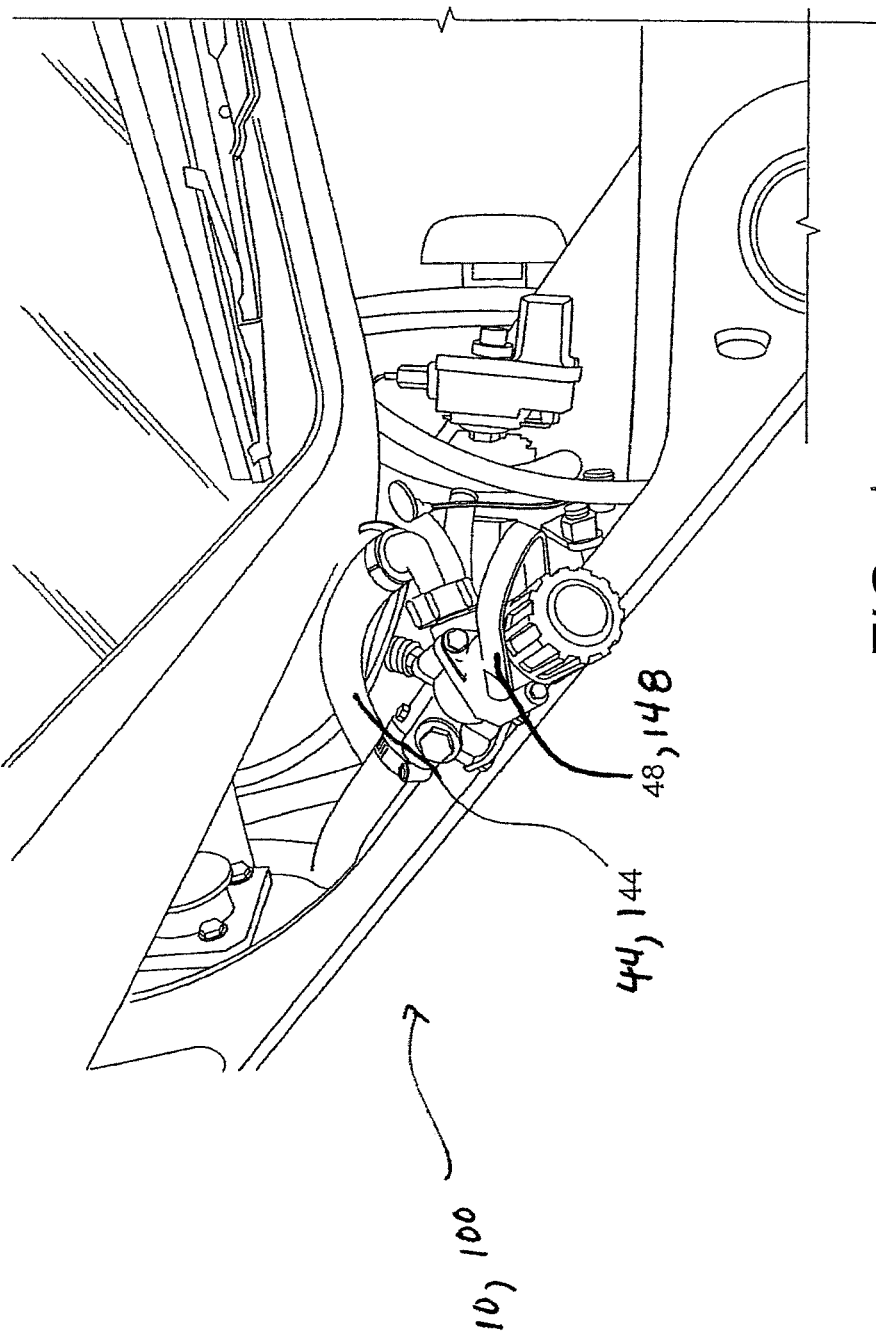
FIG. 11 shows one type of connection for routing a chemically-based treatment from a reservoir through the distribution apparatus.

As shown in FIGS. 4 and 11, conduits 22,24,122,124 are routed from a supply end 44,144 of each distribution apparatus to its respective distribution end 40,140 (FIG. 8). The conduits are coupled to at least one reservoir 14,114 that houses the chemically-based treatment 50. The reservoir(s) is/are of sufficient size and shape for mounting onto a mobile unit 16, 116. Optionally, a mounting cradle 17,117 may be used for mounting the reservoir(s) onto the mobile unit. The cradle may include flexible coupling devices, such as bands (not shown) having a width of about 2.5 inches and a length of about 74.5 inches. One or more weight bearing steps may also be coupled to the mounting cradle and/or the mobile unit. The step(s) facilitate(s) positioning, filling, and emptying of the reservoir(s) by an operator.

The reservoir(s) has/have sufficient capacity to distribute the chemically-based treatment onto vegetation over long periods. In one configuration of the system, a reservoir can have a capacity of about 250 gallons. The shape and sizes shown in the figures, however, are not to be construed as limiting. The reservoir may have any shape and size that is suitable for relatively stable mounting onto a mobile unit. The reservoir is manufactured from weather and chemically resistant materials such as polyethylene. Suitable reservoirs include those manufactured by Ace Roto-Mold, a division of Den Hartog Industries.

Preferably, disposed between the reservoir(s) and the conduits is a pumping system 42,142. The pumping system 42,142 is used for positive displacement of the chemically-based treatment from the reservoir through the passageway in the distribution apparatus to the distribution end. Suitable pumping systems include those manufactured by UDOR or any other pump manufacturer. One pump type for use in the pumping system is the UDOR Kappa 40/VA Series Pump rated for 550 revolutions per minute, 580 pounds per square inch (psi), 9.4 gpm to 12.7 gpm, and 0.4 to 2.7 kilowatts (kW). Coupled to the pumping system may be one or more valve assemblies 48,148 shown in FIG. 11, which further facilitate routing of the chemically-based treatment from the reservoir and the pumping system to the distribution end of the distribution apparatus.

Distribution apparatuses 12, 112 may be mounted onto mobile units 16,116 having wheels 21,121 or tracks (not shown). The mobile units are of sufficient size to allow for mounting of the distribution apparatus and the reservoir. Preferably, a mobile unit is an all-terrain vehicle to allow for movement along pathways positioned near power lines. In many cases, the pathways are uneven and located in areas that are infrequently traveled. As such, the mobile unit is preferably provided with various modes of positioning and steering for maneuverability of the distribution apparatus.

Mobile units which are suitable for use with the vegetation control system include those manufactured by the Bobcat Company. FIGS. 1 and 7 show a VERSAHANDLER® Telescopic Tool Carrier, manufactured by the Bobcat Company. This type of mobile unit is suited for coupling to a distribution apparatus, having telescopic tools such as those included on a crane assembly. Other types of mobile units, however, may include trucks, railcars, track vehicles, etc. Where the mobile unit is a vehicle preferably the unit is equipped with a diesel engine rated for about 100 to about 150 horsepower (hp) @ 2200 revolutions per minute (rpm). The mobile unit also preferably includes a heavy-duty transmission.

Preferred types of mobile units include a cab section 52,152. The outer portion of the cab section may be coated with one or more materials that provide weather, corrosion, and abrasion resistance. For example, components the cab section may be manufactured from laminated materials such as LEXGARD® laminated polycarbonates, which are known to have abrasion resistant surfaces.

Contained within the cab section 52, 152 may be seating 56,156 for one or more operators 57. Each cab section 52,152 includes an upper cover 54,154 that prevents operators from contacting chemical treatment(s) after distribution. Where a cab section is included, a container 60, having a washing fluid (not shown) may be coupled to the mobile unit 12. The container may be further coupled to a triggering or pumping mechanism, which facilitates washing of a windshield or other window on the cab section 52.

The cab section 52,152 may also be coupled to the chassis of the mobile unit 16 such that the cab section pivots or tilts from up to about 40° to about 60° with respect to a horizontal axis of the chassis. This type of coupling allows for optimal positioning of the boom and treatment of vegetation.

Figure 5:
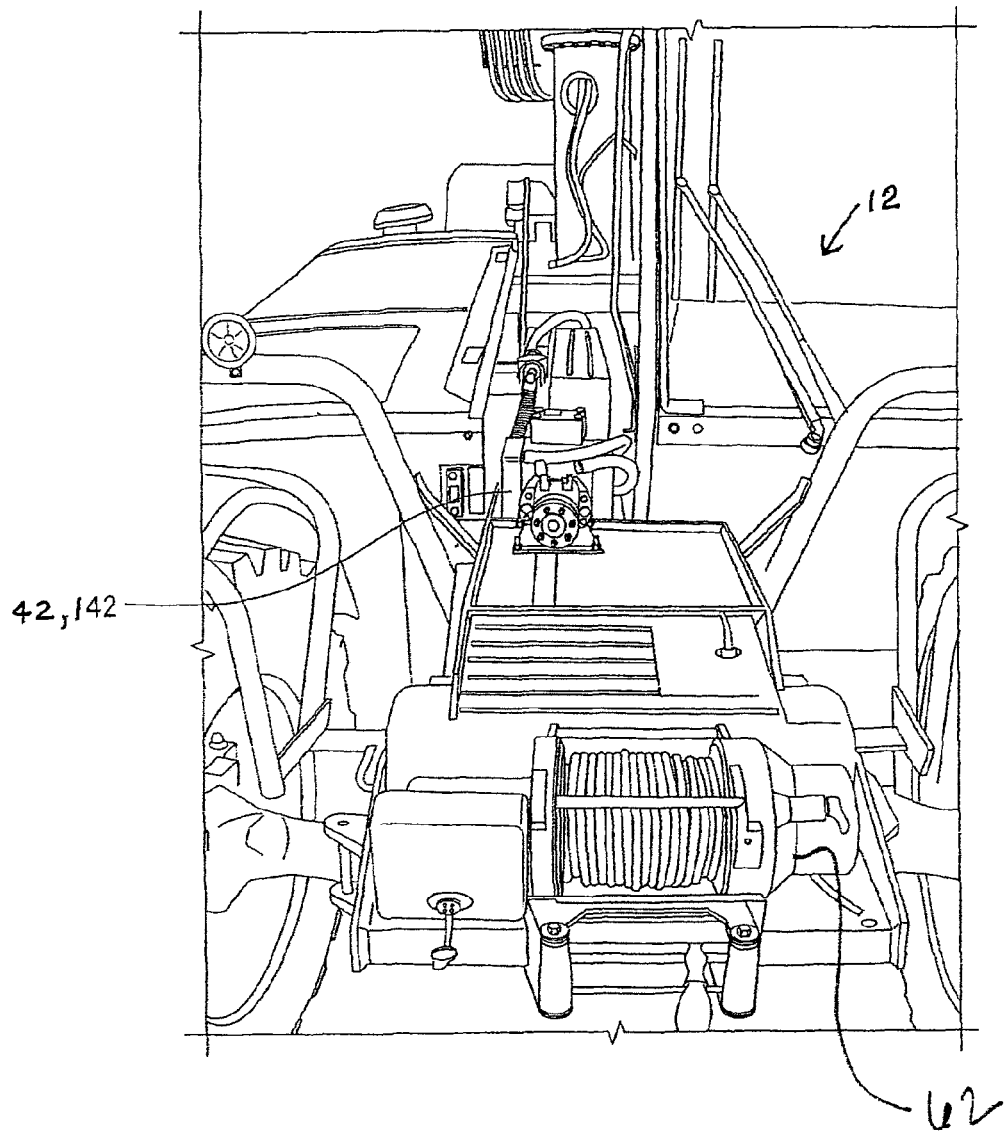
FIG. 5 shows a partial front view of the vegetation control system shown in FIG. 1, excluding a cab section of a mobile unit.

Controls 20,120 (FIG. 10) are also included in the system for targeted positioning of the distribution apparatus and the mobile unit. Optionally, the unit may be remotely manned, such that a cab section is optional. FIG. 5 shows a mobile unit 12, excluding the cab section 52. Other devices may be included, on the mobile unit, which facilitate use of the unit, especially in areas of rough terrain. For example, a winch 62,162 may be coupled to the unit, which may be used by an operator to further position the unit when it is immovable. The winch may be mounted onto any appropriate section of the mobile unit. Preferably, the winch is rear-mounted and configured to haul up to about 20,000 pounds. One or more excavation component 164 may also be included on a mobile unit 116, as particularly shown in FIG. 6.

Figure 10:
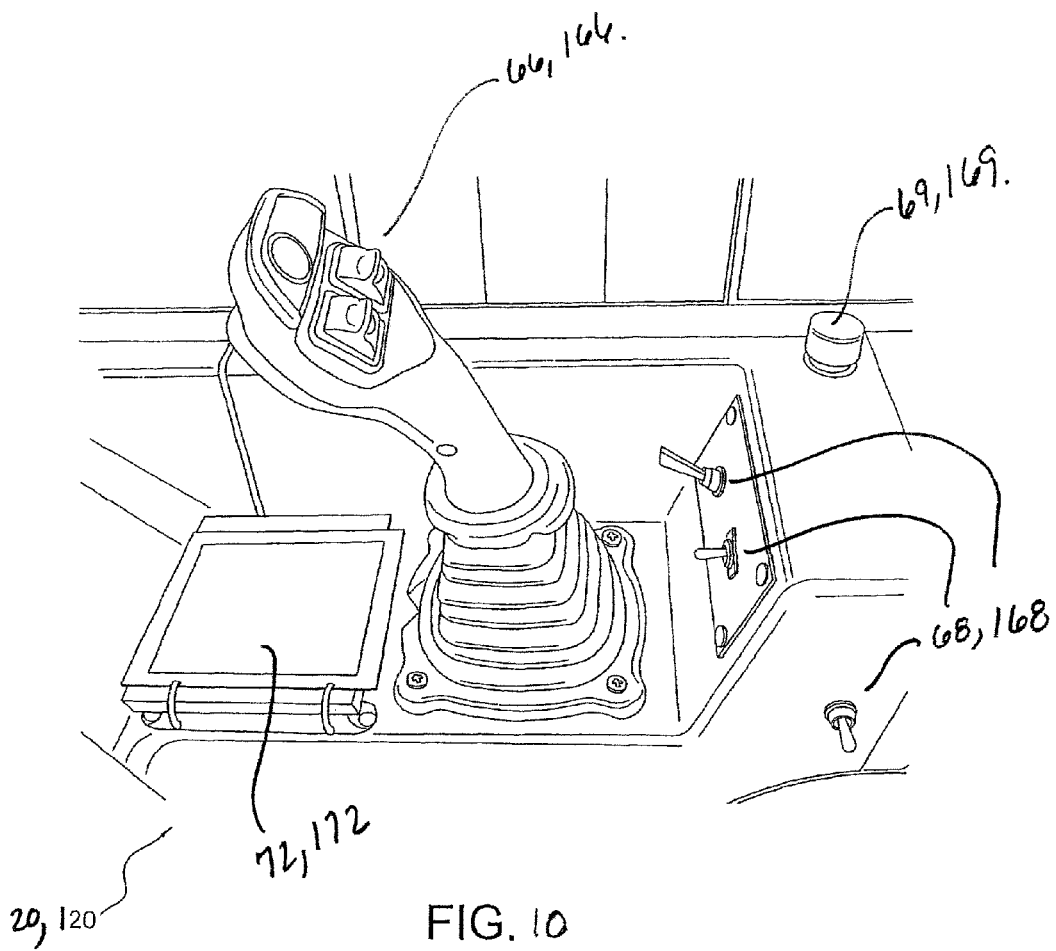
FIG. 10 shows a set of controls for use with the vegetation control system.

Also included within the cab section are controls 20,120. FIG. 10 shows controls that include a joystick 66,166. One or more joysticks or other types of controls may be used to position the distribution apparatus and thus allow for targeted distribution of the chemical treatment. Other types of controls include, but are not limited to levers 68,168, buttons 69,169 and pedals (not shown), configured for manual or remote use.

Preferably, the controls are hydraulically driven and ergonomically positioned within a cab section 52,152 for operator use. Additional controls may, however, be provided for positioning and movement of the mobile unit and the pumping system. Such controls may even be remote. For example, depending on the condition of surrounding terrain, an operator may optionally position and move the vegetation control system, using remote controls.

Other modifications can be made to the mobile unit to improve the effectiveness of chemical treatment. For example, a Global Positioning System 72,172 (GPS) may be integrated within the mobile unit such that a utility company can track implementation of its vegetation management plan.

Figure 12:
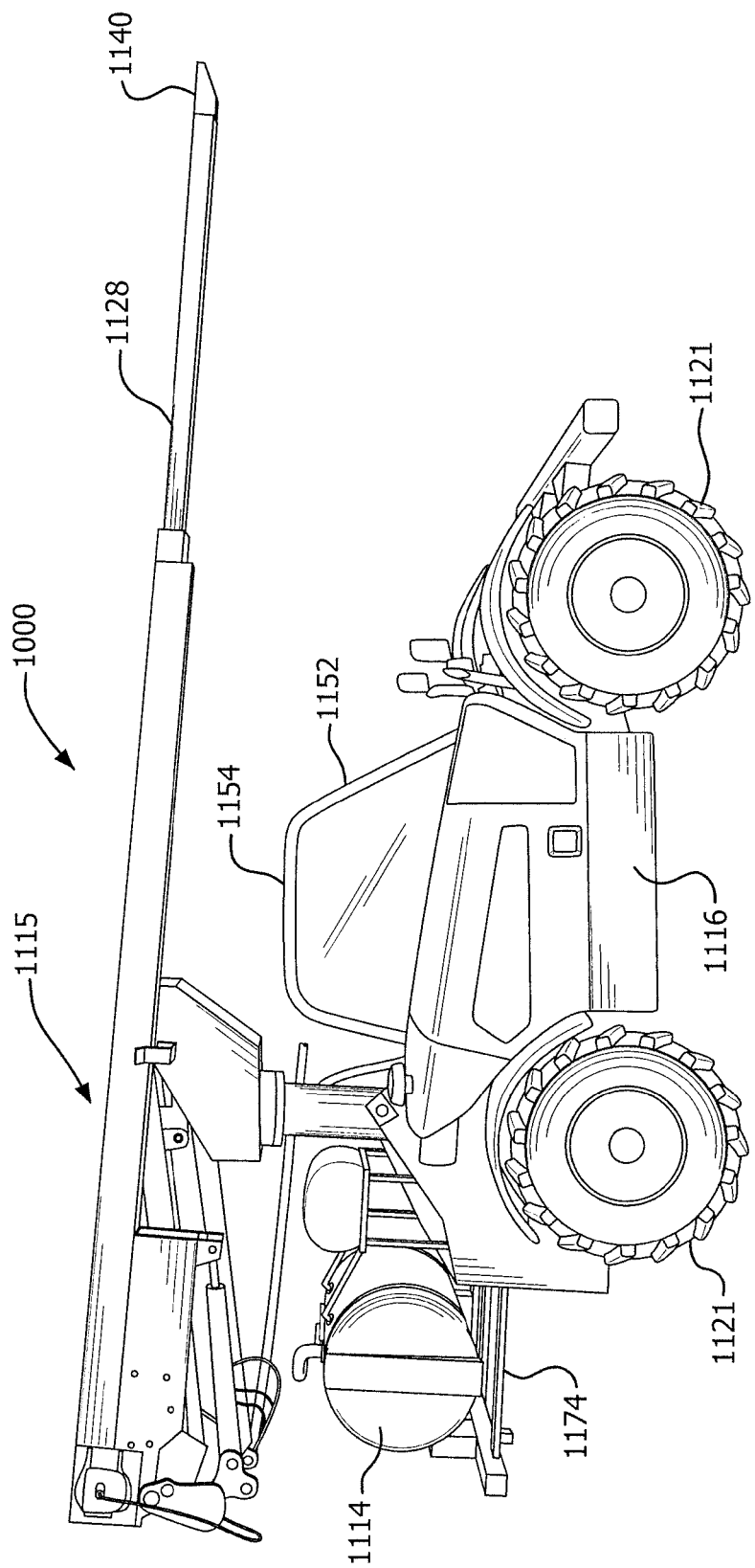
FIG. 12 shows yet another vegetation control system in accordance with this invention.
Figure 15:
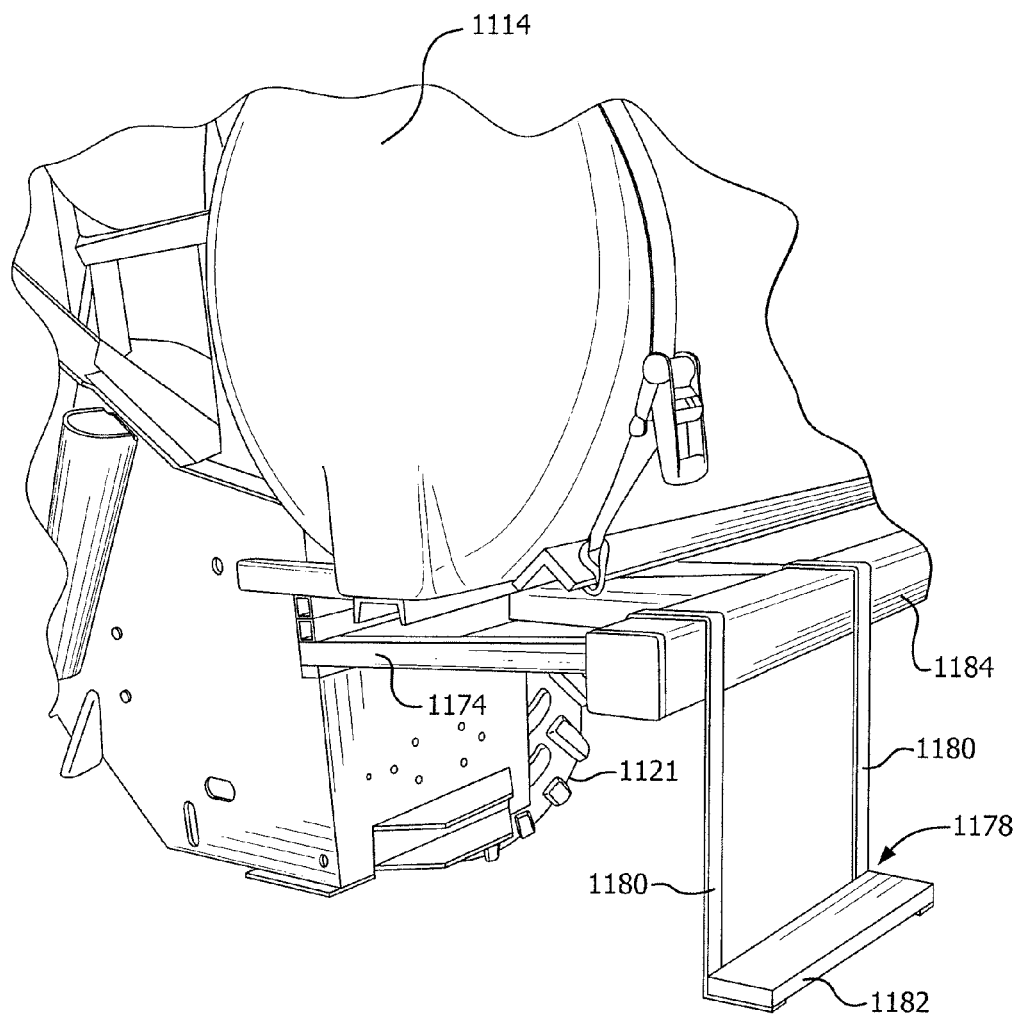
FIG. 15 is a perspective view of a further portion of the vegetation control system shown in FIGS. 12-14.

FIG. 12 illustrates a further vegetation control system 1000 in accordance with this invention. As shown therein system 1000 includes a vehicle or mobile unit 116 having a cab section 1152 with its cover 1154. If desired, the windows in cab section 1152 could be tinted and could also be made of bulletproof material to shield the operator's eyes and to protect the operator from any debris or objects ricocheting toward the vehicle 1116. Vehicle or mobile unit 1116 has large tires or wheels 1121 in order to traverse the terrain and enable it to function as an all-terrain vehicle. Vehicle 1116 includes a reservoir 1114 held by a cradle 1174. Cradle 1174 is also shown in FIG. 15.

Figure 13:
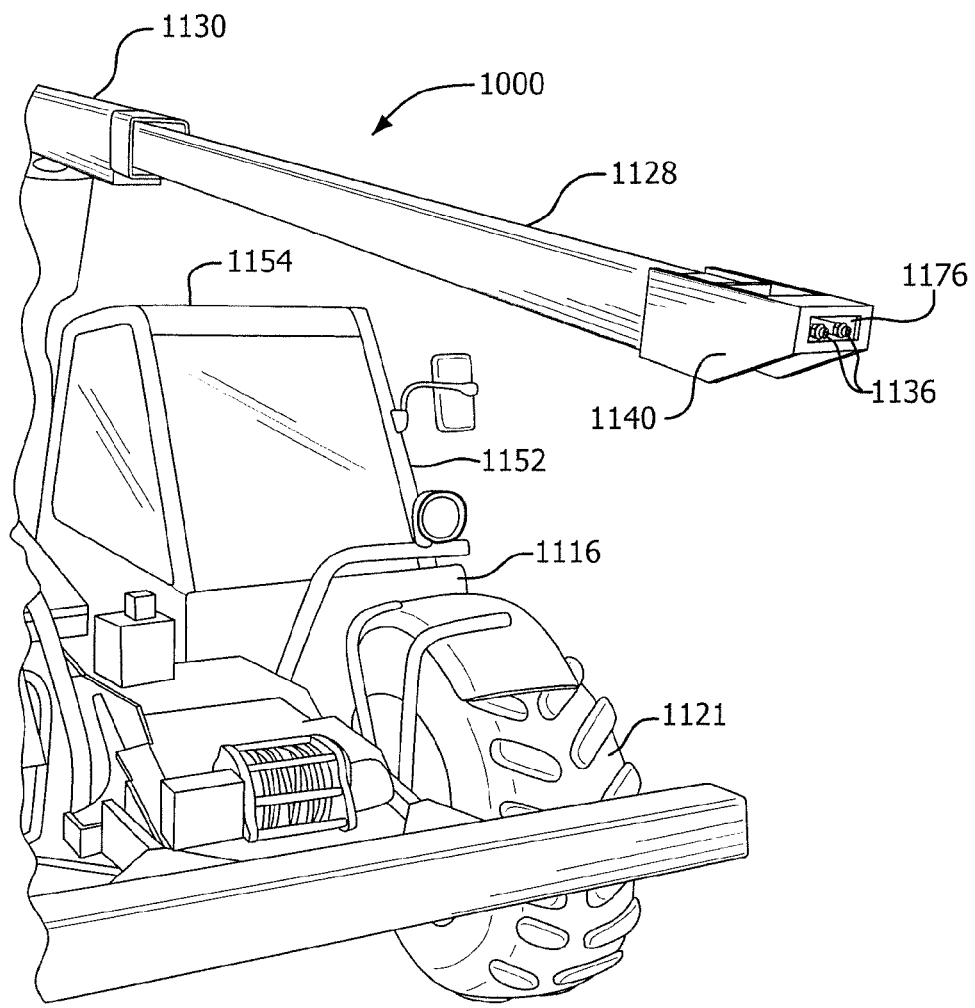
FIG. 13 is a perspective view of a portion of the vegetation control system shown in FIG. 12.

FIG. 12 illustrates the boom 115 to include a plurality of elevatable extension sections which includes the outermost section 1128 at the distribution end 1140. As shown in FIG. 13, outermost section 1128 telescopes into adjacent elevatable extension section 1130 which is connected to the remainder of the boom as previously shown and described with regard to systems 10,100. If desired, the distribution end 1140 could be pivotally mounted to outermost section 1128 so as to adjust the inclination of the nozzles 1136 which extend longitudinally of the outermost section 1128.

A particularly advantageous feature of system 1000 is that the outermost section 1128 is made of a material significantly lighter than the heavier material used for the other extension sections of the boom. Having a single section made of a lightweight material is not insignificant. In practice outermost section 1128 could be nineteen feet long. This is longer than adjacent section 1130 which could be fifteen feet ten inches long. Preferably, outermost section 1128 is made of fiberglass, whereas the other sections are made of heavier material, namely metal as used in conventional booms. This combination of the lightweight outermost section and the heavier other sections provides the advantage of the strength and stability obtained from the heavier sections which are closer to the mobile unit 1116 while also reducing the boom weight. By having the lighter outermost section 1128, it is possible to more easily maneuver the boom and, in particular, its distribution end 1140 for enhancing the application of the vegetation treatment from the nozzles 1136. Thus, the boom 1115 is more stable and not likely to tip where the outermost portion is made of a lighter material and where the portions which are lower are made of a heavier material.

Figure 14:
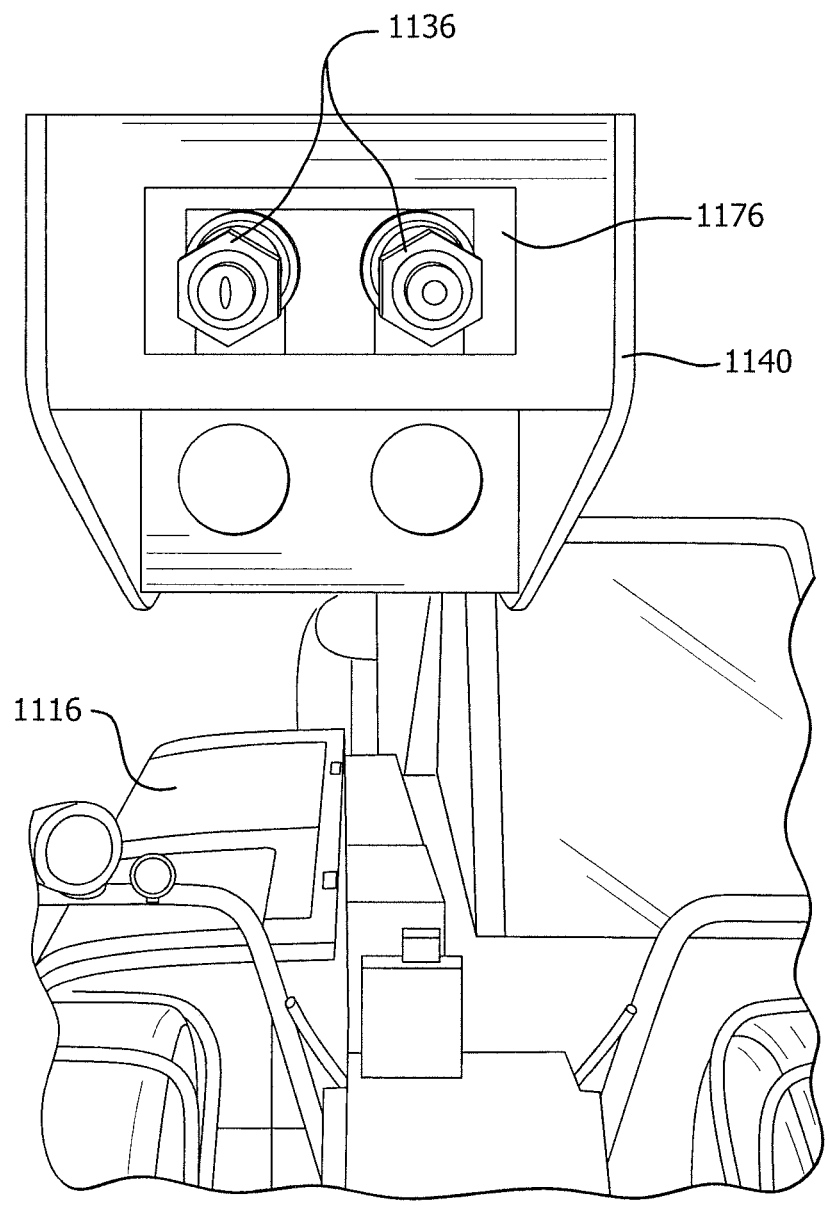
FIG. 14 is a front elevational view of a portion of the vegetation control system shown in FIGS. 12-13.

FIG. 14 illustrates an alternative form of distribution end 1140 of system 1000. As shown therein, distribution end 1140 has a rectangular opening 1176 so that the rigid nozzles 1136 are recessed within and shielded by the distribution end. See also FIG. 13. Each nozzle is connected to its conduit as in systems 10,100. As previously described the nozzles at the distribution end can provide different types of discharge patterns such as a solid stream or a spray or a fan pattern. The nozzles 1136 illustrated in FIG. 14 have openings whereby one nozzle provides a fan pattern and the other nozzle provides a stream pattern.

As shown in FIGS. 12 and 14 reservoir 1114 is mounted on cradle 1174. Cradle 1174 is constructed in any suitable manner, such as having a plurality of interconnected bars which effectively mount and support reservoir 1114. As best shown in FIG. 12 reservoir 1114 is elevated at a higher distance than, for example, the previously described reservoirs 14,114. By increasing the elevation of reservoir 1114 it is possible to increase the departure angle. Additionally, by elevating the reservoir 1114 completely above, for example, the height of the wheels 1121 there is less of a danger that the reservoir could be dislodged or damaged if the vehicle 1116 should, for example, drive over a ditch where the irregular road might otherwise contact a lower mounted reservoir.

Because reservoir is mounted at a higher elevation, system 1000 includes features to facilitate access to the reservoir. Such features include the provision of a step which preferably could be selectively moved to and from a position near cradle 1174 and to and from a remote non-use position. In a preferred embodiment illustrated in FIG. 15, a step 1178 is detachably connected to cradle 1174. Step 1182 could be formed in any suitable manner and could also be detachably mounted to cradle 1174 in any suitable manner. As illustrated step 1182 includes vertical members 1184 which would be detachably mounted to cradle 1174 such as by hooking over cradle front bar 1184. Step 1178 also includes horizontal member 1182 which forms the step itself. When it is desired to have access to reservoir 1114, step 1178 is mounted to cradle 1174. When access is no longer desired and it is intended to move the mobile unit or vehicle 1116, step 1178 is detached and placed in a stored location which could be on the vehicle itself.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A vegetation control system comprising a mobile unit, at least one reservoir containing a chemically-based treatment mounted on said mobile unit, at least one distribution apparatus coupled to said reservoir, said distribution apparatus having a supply end and a distribution end, said distribution apparatus comprising a boom having a plurality of elevatable extension sections between said supply end and said distribution end, said extension sections including an outermost section at said distribution end and an adjacent section adjacent to said outermost section, said outermost section being telescopically mounted to said adjacent section, at least one passageway in said extension sections extending from said supply end to said distribution end, at least two conduits communicating with said reservoir and routed through said passageway to said distribution end, a pump system coupled to said conduits, said distribution apparatus being free of sharp-edged tree trimming components, and at least two nozzles at said distribution end, each of said nozzles communicating with a respective one of said conduits, said nozzles being confined to said distribution end and extending longitudinally of said outermost section for applying the chemically-based treatment against vegetation in a specific targeted manner.

2. The system of claim 1, wherein said mobile unit is a vehicle having a cab section, said cab section including an upper cover to minimize an operator in said cab section from contacting falling treatment after the treatment has been applied, and said cab section being tiltable with respect to the horizontal axis of the vehicle chassis.

3. The system of claim 2, wherein said cab section is tiltable from up to about 40 degrees to about 60 degrees with respect to the horizontal axis.

4. The system of claim 1, wherein at least one of said extension sections is made of fiberglass.

5. The system of claim 1, wherein more than one of said reservoirs are mounted to said mobile unit.

6. The system of claim 1, including a winch and an excavation component mounted to said mobile unit, and said mobile unit being configured for all-terrain travel.

7. The system of claim 1, further comprising a mounting unit attached to said distribution end of said distribution apparatus to hold said nozzles in place.

8. The system of claim 1, wherein said outermost section of said boom is made of a material which is lighter than the material of other of said extension sections of said boom.

9. The system of claim 8, wherein said outermost section is made of fiberglass, and said adjacent section being made of a metal which is heavier than said fiberglass.

10. The system of claim 8, wherein said outermost section is longer than said adjacent section.

11. The system of claim 1, wherein said mobile unit is a vehicle having wheels for traversing the terrain, and said reservoir being mounted to said vehicle at an elevation completely above said wheels.

12. The system of claim 11, including a step selectively movable to a position providing access to said reservoir and to an inactive position away from said reservoir.

13. The system of claim 12, wherein said reservoir is mounted in a cradle attached to said vehicle, and said step being detachably mounted to said cradle whereby said step is in its access position when said step is mounted to said cradle and said step is in its inactive position when said step is detached from said cradle.

14. A vegetation control system comprising a mobile unit, at least one reservoir containing a chemically-based treatment mounted on said mobile unit, at least one distribution apparatus coupled to said reservoir, said distribution apparatus having a supply end and a distribution end, said distribution apparatus comprising a boom having a plurality of elevatable extension sections between said supply end and said distribution end, said extension sections including an outermost section at said distribution end and an adjacent section adjacent to said outermost section, said outermost section being telescopically mounted to said adjacent section, at least one passageway in said extension sections extending from said supply end to said distribution end, at least one conduit communicating with said reservoir and routed through said passageway to said distribution end, said distribution apparatus being free of sharp-edged tree trimming components, at least one nozzle at said distribution end, said nozzle communicating with said conduit, said nozzle being confined to said distribution end and extending longitudinally of said outermost section for applying the chemically-based treatment against vegetation in a specific targeted manner, and said outermost section of said boom being made of a material which is lighter than the material of other of said extension sections of said boom.

15. The system of claim 14, wherein said outermost section is made of fiberglass, and said adjacent section being made of a metal which is heavier than said fiberglass.

16. The system of claim 14, wherein said outermost section is longer than said adjacent section.

17. The system of claim 14, wherein said mobile unit is a vehicle having wheels for traversing the terrain, and said reservoir being mounted to said vehicle at an elevation completely above said wheels.

18. The system of claim 17, including a step selectively movable to a position providing access to said reservoir and to an inactive position away from said reservoir.

19. The system of claim 18, wherein said reservoir is mounted in a cradle attached to said vehicle, and said step being detachably mounted to said cradle to provide selective access to said reservoir.

* * * * *